Jan. 5, 1926.                                     1,568,949
W. A. STARCK
BUMPER ATTACHER
Filed May 9, 1921                2 Sheets-Sheet 1
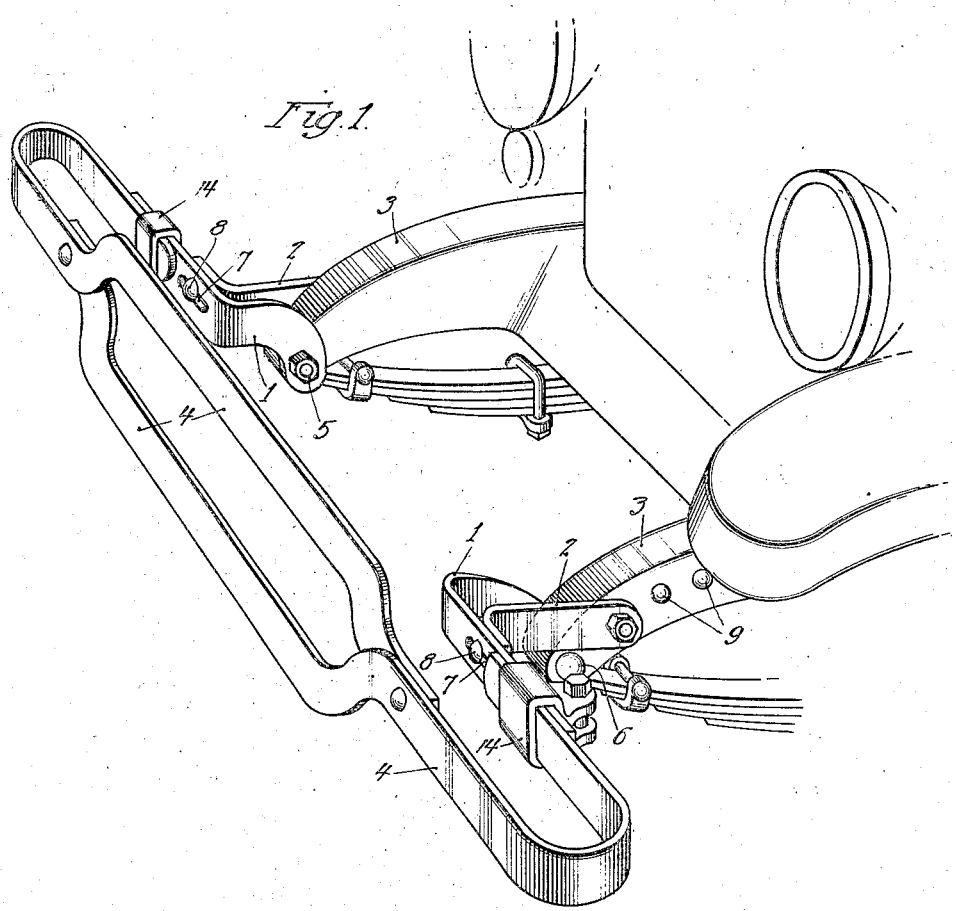
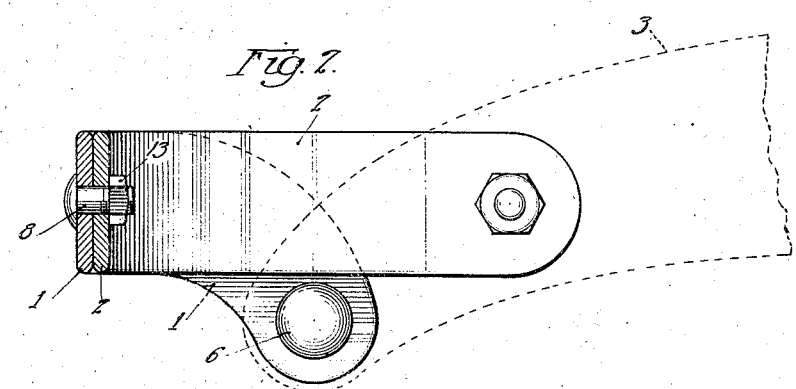
Inventor
William A. Starck
By Edwin B. H. Tower Jr
Atty.

Jan. 5, 1926.
W. A. STARCK
1,568,949
BUMPER ATTACHER
Filed May 9, 1921
2 Sheets-Sheet 2
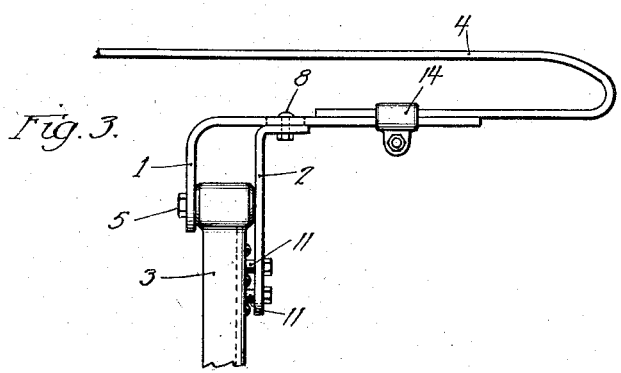
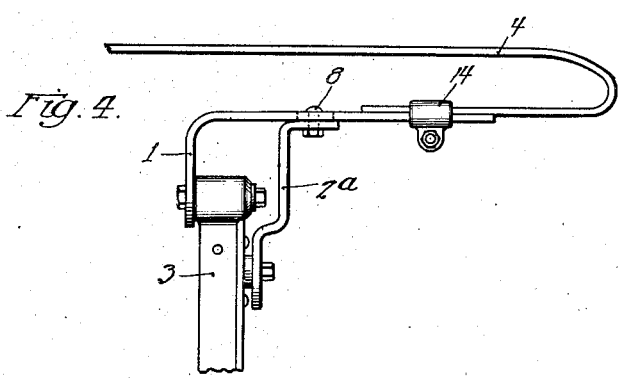
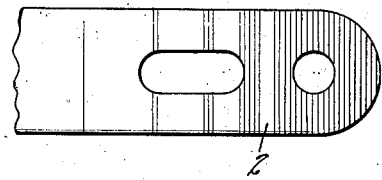
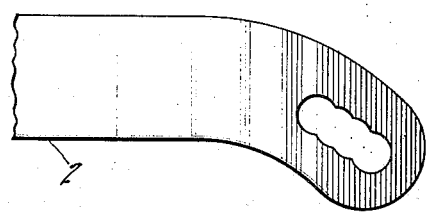
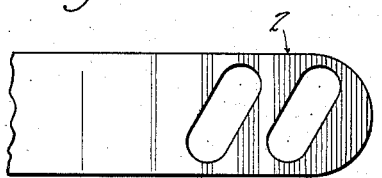
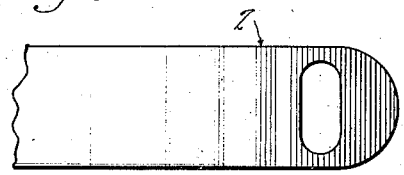
Inventor:
William A. Starck Patented Jan. 5, 1926.

1,568,949

UNITED STATES PATENT OFFICE.

WILLIAM A. STARCK, OF MILWAUKEE, WISCONSIN, ASSIGNOR, BY MESNE ASSIGNMENTS, TO GEORGE ALBERT LYON, OF PHILADELPHIA, PENNSYLVANIA.

BUMPER ATTACHER.

Application filed May 9, 1921. Serial No. 467,895.

*To all whom it may concern:*

Be it known that I, WILLIAM A. STARCK, a citizen of the United States, residing at Milwaukee, in the county of Milwaukee and State of Wisconsin, have invented new and useful Improvements in Bumper Attachers, of which the following is a specification.

This invention relates to a bumper bracket or attacher.

An object of the invention is to provide a bumper bracket which may be readily attached to the side bar of an automobile frame and which will be rigidly held in a fixed position thereon.

Another object is to provide a bumper bracket which is adjustable to fit side bars of different widths.

Another object is to provide a bumper bracket which is adjustable to fit side bars of different forms.

Another object is to provide a bumper bracket which may be readily manufactured.

The bumper bracket comprehended by this invention comprises two separate arms having the rear ends thereof arranged at different distances from the front of the bracket and adapted to be attached to the side bar of an automobile frame at different points along the same, and separate means connecting said arms together.

The views of the drawings are as follows:

Fig. 1 is a perspective of a pair of attachers fastened to an automobile chassis and supporting a bumper bar;

Fig. 2 is a vertical section of line 2—2 of Fig. 1;

Fig. 3 is a top plan of an attacher;

Fig. 4 is a top plan of an attacher having one arm bent or off-set to avoid the head of a shackle bolt;

Fig. 5 is a side elevation of one form of attacher arm;

Fig. 6 is a side elevation of another form of attacher arm having an elongated slot with serrated edges;

Fig. 7 is a side elevation of another form of attaching arm having two oblique slots therein; and Fig. 8 is a side elevation of still another form of attacher arm having a single slot.

The bracket or attacher comprises, in general, a pair of arms 1 and 2, the arm 1 being arranged to be fastened at one end to the frame side bar 3, and at its other end to a bumper bar 4, while the arm 2 is arranged at one end to be adjustably fastened to the arm 1 and at its other end to the frame side bar 3.

Figures 1 to 3 will be described first.

The arm 1 of suitable shape, has a portion lying in a plane substantially parallel with the bumper bar, and extending rearwardly and downwardly therefrom is an extension provided with a bolt hole near or at the end thereof. This arm may be bolted or otherwise fastened to the end of the side bar 3. A very satisfactory way of connecting this arm to the side bar flange is to remove the nut 5 from the end of the shackle bolt 6 connecting the forward end of the chassis and springs, and bolt the arm thereon. If the shackle bolt is too short to receive the end of the attaching arm, the regular shackle bolt may be removed and a longer bolt substituted therefor.

That part of the arm 1 lying substantially parallel with the bumper bar is provided with an elongated slot 7 to receive a carriage bolt 8 for fastening the arms 1 and 2 together.

The forward part of the arm 2 is bent over in a plane also substantially parallel to the bumper bar and is rigidly fastened to the arm 1 by the bolt 8 or other fastening means.

The rearwardly extending part of the arm 2 is provided with an aperture to receive a bolt for fastening the arm to the web of the side bar.

Rivets 9 usually extend through the web of the side bar flange. To avoid drilling holes in the web to receive bolts for fastening the attaching arms to the side bar flange one or more of these rivets may be removed and bolts inserted through the rivet holes and registering holes in the attaching arms to clamp the arm 2 to the side bar flange.

On account of the heads on the rivets which sometimes extend through the side bar web, the bar 2 may not fit properly against the side of the flange. This may be overcome by providing washers or collars 11 interposed between the web of the side bar flange and the attaching arm so as to form a proper seat for the arm.

Fig. 4 shows a bracket or attacher, the attaching arm 2ª of which is formed or bent to avoid the head of the shackle bolt.

Figures 5 to 8 inclusive illustrate various ways in which the rear end of the attaching arm 2 may be drilled or slotted to provide for the adjustable attachment of the arm to an automobile side bar.

The manner of fastening the attacher to an automobile chassis is as follows:

The two attaching arms 1 and 2 are loosely fastened together by means of the carriage bolt 8. The nut 5 on the inner end of the shackle bolt 6 is removed, the end of the shackle bolt passed through the hole in the end of arm 1 and the nut 5 is then replaced. To fasten the arm 2 to the automobile chassis, holes may be drilled in the web of the side bar, or if rivets are already inserted in the web these rivets may be removed and bolts inserted through the openings drilled for the rivets and through the openings in the attaching arm. The bolts will then serve to take the place of the rivets and to hold the arm firmly in position.

The position of the brackets may be adjusted relative to the frame by turning the bracket on the bolt 6, and likewise, the rear end of the arm 2 may be adjusted vertically to bring it into position to be fastened to the side bar by the bolt.

The nut 13 is tightened on the bolt 8 to fasten the two arms firmly together.

After the bracket or attacher has been fastened securely to the automobile frame the bumper bar may be rigidly fastened to the horizontal or free end of the attacher by means of a clamp or clip 14 which may be of the type disclosed in Isgrig Patent No. 1,394,904, issued October 25, 1921.

Obviously other embodiments and adaptations may be made of the invention contained herein.

The invention claimed is:

1. An attacher for fastening an automobile bumper to the side bar of an automobile frame comprising a pair of arms adapted to be fastened to the side bar, a portion of each of said arms lying in a plane substantially parallel to the bumper, means for fastening said arms together, and means for fastening a bumper bar to one of said attaching arms.

2. An attacher for fastening an automobile bumper to the side bar of an automobile frame comprising a pair of arms adapted to be fastened to opposite sides of the side bar, a portion of each of said arms lying in a plane substantially parallel to the bumper, adjustable means for fastening said arms together, and means for fastening a bumper bar to one of said attaching arms.

3. An attacher for fastening an automobile bumper to the side bar of an automobile frame comprising a pair of arms adapted to be attached to opposite sides of a side bar, means for fastening said arms together, and means for clamping a bumper bar to one of said attaching arms.

4. A bumper support for connection to the side bar of an automobile frame comprising a pair of attaching arms, one of said arms being adapted to be fastened to the web of the side bar, the other of said arms being adapted for fastening to the opposite side of the side bar, means for fastening said arms together, and means for clamping a bumper bar to one of the attaching arms.

5. A bumper support for connection to the side bar of an automobile frame comprising a pair of attaching arms, one of said arms being adapted to be fastened to the web of the side bar, the other of said arms being adapted for fastening to the shackle bolt at the end of the frame, means for fastening said arms together and means for clamping a bumper bar to one of the attaching arms.

6. A bumper support for connection to the side bar of an automobile frame comprising a pair of attaching arms, one of said arms being adapted to be fastened to the web of the side bar, the other of said arms being adapted for fastening to the opposite side of the side bar, adjustable means for fastening said arms together, and means for clamping a bumper bar to one of the attaching arms.

7. A bumper support for connection to the side bar of an automobile frame comprising a pair of attaching arms, said arms being adjustable in a vertical plane to hold the bumper at various heights, one of said arms being adapted to be fastened to the web of the side bar, the other of said arms being adapted for fastening to the opposite side of the side bar, adjustable means for fastening said arms together whereby the distance between said arms may be varied, and means for fastening a bumper bar to the attaching arms.

8. A bumper support for connection to the side bar of an automobile frame comprising two attaching arms, said arms being adjustable in a vertical plane to hold the bumper at various heights, one of said arms being adapted to be fastened to the web of the side bar, the other of said arms being adapted for fastening to the opposite side of the side bar, and adjustable means comprising overlapping front portions of said arms for fastening said arms together whereby the distance between said arms may be varied.

9. A bumper support for connection to the side bar of an automobile frame comprising two attaching arms, said arms being adjustable in a vertical plane to hold the bumper at various heights, one of said arms being adapted to be fastened to the web of the side bar, the other of said arms being adapted for fastening to the opposite side of the side bar, and means comprising overlapping portions of said arms for fastening said arms together.

10. A bumper support for connection to the side bar of an automobile frame comprising two attaching arms, one of said arms being adapted to be fastened to the web of the side bar, the other of said arms being adapted for fastening to the opposite side of the side bar, and adjustable means for fastening said arms together.

11. The combination with a channeled frame member downwardly curved at its end and a shackle bolt carried thereby, of a pair of substantially parallel longitudinal arms of different lengths, a transverse member adjustably spacing said arms apart whereby they may be engaged with opposite sides of said frame member, and fastening means engageable with said channeled frame member and with the longer bracket arm at any one of a plurality of points, the shorter arm being downwardly bent and apertured to receive said shackle bolt.

12. The combination with channeled automobile frame members downwardly curved at their ends and shackle bolts carried thereby, of a pair of attaching brackets each comprising two substantially parallel longitudinal arms of different lengths, a transverse member to be engaged by a transverse portion of an automobile bumper and adjustably spacing said arms apart whereby they may be engaged with opposite sides of one of said frame members, and fastening means engageable with said channeled frame member and with the longer bracket arm at any one of a plurality of points, the shorter arm being downwardly bent and apertured to receive one of said shackle bolts.

13. The combination with channeled automobile frame members downwardly curved at their ends and shackle bolts carried thereby, of a pair of bumper attaching brackets, each comprising two longitudinal arms of different lengths, a transversely extending end on one of said arms for attachment to the bumper, and a transversely extending end on said other arm for attachment to said first mentioned arm whereby said arms may be adjustably spaced apart to be secured to opposite sides of one of the frame members.

14. An automobile having channeled frame members projecting downward at their ends and provided with spring bolts, a bumper having transversely extending supporting portions to be secured to said frame members, and a pair of bumper attaching brackets each comprising two attaching arms having rear portions adapted to be fastened on opposite sides of one of said frame members and having outwardly bent overlapping front ends arranged in substantially vertical planes, and means to adjustably clamp together said front ends and secure them to the cooperating bumper supporting portion.

15. An automobile having channeled frame members provided with spring bolts, a bumper having transversely extending supporting portions to be secured to said frame members, and a pair of bumper attaching brackets each comprising two attaching arms having rear portions adapted to be fastened on opposite sides of one of said frame members and having transversely extending overlapping front ends, and means to clamp together said front ends and secure them to the cooperating bumper supporting portion.

16. An automobile having channeled frame members, a bumper having transversely extending supporting portions to be secured to said frame members, and a pair of bumper attaching brackets each comprising two steel strip attaching arms having rear portions adapted to be fastened on opposite sides of one of said frame members and having outwardly bent transversely extending overlapping front portions arranged in substantially vertical planes, and means to adjustably clamp together said front portions and secure them to the cooperating bumper supporting portion.

17. An automobile having channeled frame members, a bumper having transversely extending supporting portions to be secured to said frame members, and a pair of bumper attaching brackets each comprising two steel strip attaching arms having rear portions adapted to be fastened on opposite sides of one of said frame members and having transversely extending overlapping front portions arranged in substantially vertical planes, and means to connect said front portions and secure them to the cooperating bumper supporting portion.

18. An automobile having channeled frame members provided with spring bolts, and a pair of bumper attaching brackets each comprising two steel strip attaching arms having rear portions adapted to be rigidly fastened on opposite sides of one of said frame members at different distances from its end and having outwardly bent transversely extending overlapping front ends arranged in substantially vertical planes, and means to rigidly connect said front ends and adjustably secure them to the cooperating transversely extending supporting portion of an automobile bumper.

19. An automobile having channeled frame members provided with spring bolts, and a pair of bumper attaching brackets each comprising two attaching arms of different lengths having rear portions adapted to be fastened on opposite sides of one of said frame members and having overlapping transversely extending front portions arranged in substantially vertical planes, and means to connect said front in rigid alignment and secure them to the cooperating supporting portion of an automobile bumper.

20. An automobile having channeled frame members provided with depending front ends and cooperating spring bolts, a bumper having transversely extending supporting portions to be secured to said frame members, and a pair of long attaching arms each having a transversely extending front clamping portion and a depending rear end adapted to be rigidly clamped to one of said spring bolts, and right and left short steel strip attaching arms to be fastened on the side of one of said frame members opposite to the cooperating long arm, said short arms having outwardly bent transversely extending front connecting portions arranged in substantially vertical planes, and means to adjustably clamp together said front portions of each cooperating short and long attaching arm in rigid alignment and secure them to the cooperating bumper supporting portion.

21. An automobile having channeled frame members provided with depending front ends and cooperating spring bolts, a bumper having transversely extending supporting portions to be secured to said frame members, and a pair of long attaching arms each having a transversely extending front clamping portion and a rear end adapted to be rigidly clamped to one of said spring bolts, and right and left short steel strip attaching arms having vertically bent apertured rear portions each adapted to be fastened on the side of one of said frame members opposite to the cooperating long arm, said short arms having transversely extending front connecting portions, and means to clamp together said front portions of each cooperating short and long attaching arm in rigid alignment and secure them to the cooperating bumper supporting portion.

22. An automobile having channeled frame members provided with depending front ends and cooperating spring bolts, a bumper having transversely extending portions to be secured to said frame members, and a pair of long attaching arms each having a transversely extending front clamping portion and a depending rear end adapted to be rigidly clamped to one of said spring bolts, and right and left short steel strip attaching arms having vertically adjustable rear connecting members each adapted to be fastened on the side of one of said frame members opposite to the rear end of the cooperating long arm and considerably in rear thereof, said short arms having transversely extending front connecting portions, and means to clamp rigidly together in adjusted position said front portions of each cooperating short and long attaching arm and secure them to the cooperating bumper portion.

23. An automobile having channeled frame members provided with depending front ends, a bumper having transversely extending portions to be secured to said frame members, and a pair of short attaching arms each having a transversely extending front clamping portion and a depending rear end adapted to be rigidly clamped to one of said frame members, and right and left long steel strip attaching arms having vertically adjustable rear connecting members each adapted to be fastened on the side of one of said frame members opposite to the rear end of the cooperating short arm and considerably in rear thereof, said long arms having transversely extending front connecting portions, and means to clamp rigidly together in adjusted position said front portions of each cooperating short and long attaching arm and secure them to the cooperating bumper portion.

24. A bumper attaching bracket for fastening an automobile bumper to the channeled frame member of an automobile, comprising two steel strip arms adapted to be fastened to the opposite sides of the frame member, the front end of each of said arms being bent outward to lie in a plane substantially parallel to the bumper front, means for adjustably connecting the overlapping front ends of said arms in rigid alignment and for adjustably fastening thereto the inturned transversely extending supporting member of the bumper.

25. A bumper attaching bracket for fastening an automobile bumper to the channeled frame member of an automobile, comprising two arms adapted to be fastened to the opposite sides of the frame member, the front end of one of said arms being bent substantially parallel to the bumper front, means for connecting the overlapping front portions of said arms and for fastening thereto the transversely extending supporting member of the bumper.

26. A bumper support for connection to the side bar of an automobile frame, comprising two attaching arms having outwardly bent transversely extending front ends arranged in substantially vertical planes and overlapping each other, and means for rigidly fastening said arms together and for fastening a bumper bar thereto, the rear ends of said arms being adapted to be fastened on opposite sides of the automobile side bar.

27. A bumper support for connection to the side bar of an automobile frame, comprising two attaching arms having transversely extending front ends arranged in substantially vertical planes and overlapping each other, and means for adjustably fastening said arms together and for fastening a bumper bar thereto.

28. A bumper attaching bracket for fastening an automobile bumper to the channeled frame member of an automobile, comprising two steel strip arms adapted to be fastened to the opposite sides of the frame member at longitudinally separated points, the front end of each of said arms being bent to form a transversely extending vertical clamping portion in a plane substantially parallel to the bumper front, means for adjustably connecting the overlapping front clamping portions of said arms and for fastening thereto the transversely extending supporting member of the bumper, one of said arms having its fastening connection with the frame member vertically adjustable with respect to its front clamping portion.

29. A bumper attaching bracket for fastening an automobile bumper to the channeled frame member of an automobile, comprising two arms adapted to be fastened to the opposite sides of the frame member at longitudinally separated points, the front end of one of said arms being bent to form a transversely extending clamping portion, means for adjustably connecting the overlapping front clamping portions of said arms and for fastening thereto the transversely extending supporting member of the bumper, one of said arms having its fastening connection with the frame member vertically adjustable with respect to its front portion.

30. A bumper attaching bracket for fastening an automobile bumper to the channeled frame member of an automobile, comprising two arms adapted to be fastened to the opposite sides of the frame member at longitudinally separated points, the front end of each of said arms extending transversely to form an adjustable clamping portion, and means for rigidly connecting the overlapping front clamping portions of said arms and for fastening thereto the transversely extending supporting member of the bumper.

31. An end guard for an automobile, comprising two cooperating separable frame-attachment members formed with outwardly bent forward ends having opposed substantially vertical anterior and posterior clamping portions adapted to be clamped together and to a part of the guard.

32. An end guard for an automobile, comprising two cooperating separable frame-attachment members having opposed substantially vertical anterior and posterior clamping portions adapted to be clamped together and to a part of the guard.

33. An end guard for an automobile frame, and independent rearwardly extending attachment members of different lengths and having rear portions adapted to be secured on opposite sides of a longitudinally extending part of said frame and having opposed transversely extending front clamping portions arranged in substantially vertical planes to be adjustably clamped together and to a part of the guard.

34. An end guard for an automobile frame, and independent attachment members adapted to be secured on opposite sides of an extending part of said frame at different distances from its end and having opposed clamping portions arranged in substantially vertical transverse planes to be adjustably clamped together and to a part of the guard.

35. An automobile attachment bracket for an end-guard, comprising two separate attachment members extending rearward to different distances and having transversely extended clamping portions at the front ends thereof, and means to clamp said transverse portions together.

36. A clamping fitting and support for an end guard for an automobile, comprising two steel bars having rearwardly extending attachment portions of different length and being bent outwardly into overlapping relation at their front ends to be rigidly clamped together and to a guard member in adjustable positions, said attachment portions having bolt openings and said overlapping portions having registering bolt openings.

37. An attachment fitting for an automobile end-guard comprising two members spaced apart transversely at their rear ends to embrace and be secured to a frame member and having transversely extending overlapping forward portions clamped together and to a portion of the end-guard.

38. An attachment fitting for an automobile end-guard, comprising two members fitted at their forward ends for attachment to the end-guard, and at their rear ends spaced apart to embrace the automobile end-frame for connection thereto at different levels.

39. A bumper bracket comprising two separate parallel arms having the rear ends thereof arranged at different distances from the front of the bracket and adapted to be attached to the side bar of an automobile frame at different points along the same, and independent means connecting said arms together, the rear end of one arm being vertically adjustable.

40. A bumper bracket comprising two separate parallel arms having the rear ends thereof arranged at different distances from the front of the bracket and adapted to be attached to the side bar of an automobile frame at different points along the same, independent means connecting said arms together, the rear end of one arm being vertically adjustable, and means carried by the bracket for attaching the bumper cross bar thereto.

In witness whereof, I have hereunto subscribed my name.

WILLIAM A. STARCK.